(12) United States Patent
Acero et al.

(10) Patent No.: US 7,983,901 B2
(45) Date of Patent: *Jul. 19, 2011

(54) COMPUTER-AIDED NATURAL LANGUAGE ANNOTATION

(75) Inventors: Alejandro Acero, Bellevue, WA (US); Ye-Yi Wang, Redmond, WA (US); Leon Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/436,387

(22) Filed: May 6, 2009

(65) Prior Publication Data
US 2009/0276380 A1 Nov. 5, 2009

Related U.S. Application Data

(63) Continuation of application No. 10/142,623, filed on May 10, 2002, now Pat. No. 7,548,847.

(51) Int. Cl.
*G06F 17/27* (2006.01)
(52) U.S. Cl. .......................................................... 704/9
(58) Field of Classification Search ...................... 704/9
See application file for complete search history.

(56) References Cited

U.S. PATENT DOCUMENTS

| | | | |
|---|---|---|---|
| 4,297,528 A | 10/1981 | Beno | |
| 4,829,423 A | 5/1989 | Tennant et al. | |
| 4,864,502 A | 9/1989 | Kucera et al. | |
| 5,299,125 A * | 3/1994 | Baker et al. | 704/9 |
| 5,377,303 A | 12/1994 | Firman | |
| 5,740,425 A | 4/1998 | Povilus | |
| 5,864,788 A | 1/1999 | Kutsumi | |
| 5,909,667 A | 6/1999 | Leontiades et al. | |
| 6,006,183 A * | 12/1999 | Lai et al. | 704/235 |
| 6,275,791 B1 * | 8/2001 | Weise | 704/9 |
| 6,292,767 B1 | 9/2001 | Jackson et al. | |
| 6,360,197 B1 | 3/2002 | Wu et al. | |
| 6,418,434 B1 * | 7/2002 | Johnson et al. | 1/1 |
| 6,424,983 B1 | 7/2002 | Schabes et al. | |
| 6,434,523 B1 * | 8/2002 | Monaco | 704/257 |
| 6,446,081 B1 | 9/2002 | Preston | |
| 6,993,475 B1 | 1/2006 | McConnell et al. | |
| 7,080,004 B2 | 7/2006 | Wang et al. | |
| 7,379,862 B1 | 5/2008 | Chang et al. | |
| 7,418,443 B2 * | 8/2008 | Yoshimura et al. | 1/1 |

(Continued)

FOREIGN PATENT DOCUMENTS
WO 03096217 A2 11/2003

OTHER PUBLICATIONS

Official Notice of Rejection of Japanese Patent Application No. 2003-133823 mailed Nov. 2, 2007.

(Continued)

*Primary Examiner* — Eric Yen
(74) *Attorney, Agent, or Firm* — Joseph R. Kelly; Westman, Champlin & Kelly, P.A.

(57) ABSTRACT

The present invention uses a natural language understanding system that is currently being trained to assist in annotating training data for training that natural language understanding system. Unannotated training data is provided to the system and the system proposes annotations to the training data. The user is offered an opportunity to confirm or correct the proposed annotations, and the system is trained with the corrected or verified annotations.

13 Claims, 10 Drawing Sheets

U.S. PATENT DOCUMENTS

2002/0128821 A1     9/2002    Ehsani et al.
2003/0212543 A1    11/2003   Epstein et al.

OTHER PUBLICATIONS

European Search Report for corresponding European Patent Application No. 03008805.8 mailed May 30, 2007.

"Learning to Generate Semantic Annotation for Domain Specific Sentences", by Jianming Li, Lei Zhang and Yong Yu, Oct. 21, 2001.

"Stochastically-Based Natural Language Understanding Across Tasks and Languages", by Wolfgang Minker, 5th European Conference on Speech Communication and Technology (Eurospeech) '97, Rhodes, Greece, vol. 3 of 5, Sep. 22, 1997, pp. 1423-1426.

"Grammar Learning for Spoken Language Understanding", by Ye-Yi Wang and Alex Acero, Automatic Speech Recognition and Understanding, 2001, pp. 292-295.

Gavalda, "Epiphenomenal Grammar Acquisition with GSG", in Proceedings of the Workshop on Conversational Systems of the 6th Conference on Applied Natural Language Processing and the 1st Conference of the North American Chapter of the Association for Computational Linguistics (NLP/NAACL-2000), Seattle, U.S.A., 2000.

Gavalda, "Interactive Grammar Repair." In Proceedings of the Workshop of Automated Acquisition of Syntax and Parsing of the 10th European Summer School in Logic, Language and Information (ESSLLI-1998), Saarbrucken, Germany, Aug. 1998.

Notice of First Office Action of corresponding Chinese application No. 03123495.X dated Mar. 10, 2006.

Zue, Victor, Seneff, Stephanie, Glass, James R., et al. "Jupiter: A Telephone-Based Conversational Interface for Weather Information." IEEE Transactions on Speech and Audio Processing, vol. 8, No. 1, Jan. 2000, pp. 85-96.

Chinese Office Action (No. 03123495.X) dated Mar. 10, 2006, 19 pages.

U.S. Appl. No. 10/142,623 Notice of Allowance mailed Mar. 16, 2009, 10 pages.

U.S. Appl. No. 10/142,623 Office Action mailed Dec. 4, 2008, 26 pages.

U.S. Appl. No. 10/142,623 Office Action mailed Jun. 16, 2008, 25 pages.

U.S. Appl. No. 10/142,623 Office Action mailed Nov. 16, 2007, 28 pages.

U.S. Appl. No. 10/142,623 Office Action mailed Mar. 7, 2007, 26 pages.

U.S. Appl. No. 10/142,623 Office Action mailed Sep. 14, 2006, 18 pages.

* cited by examiner

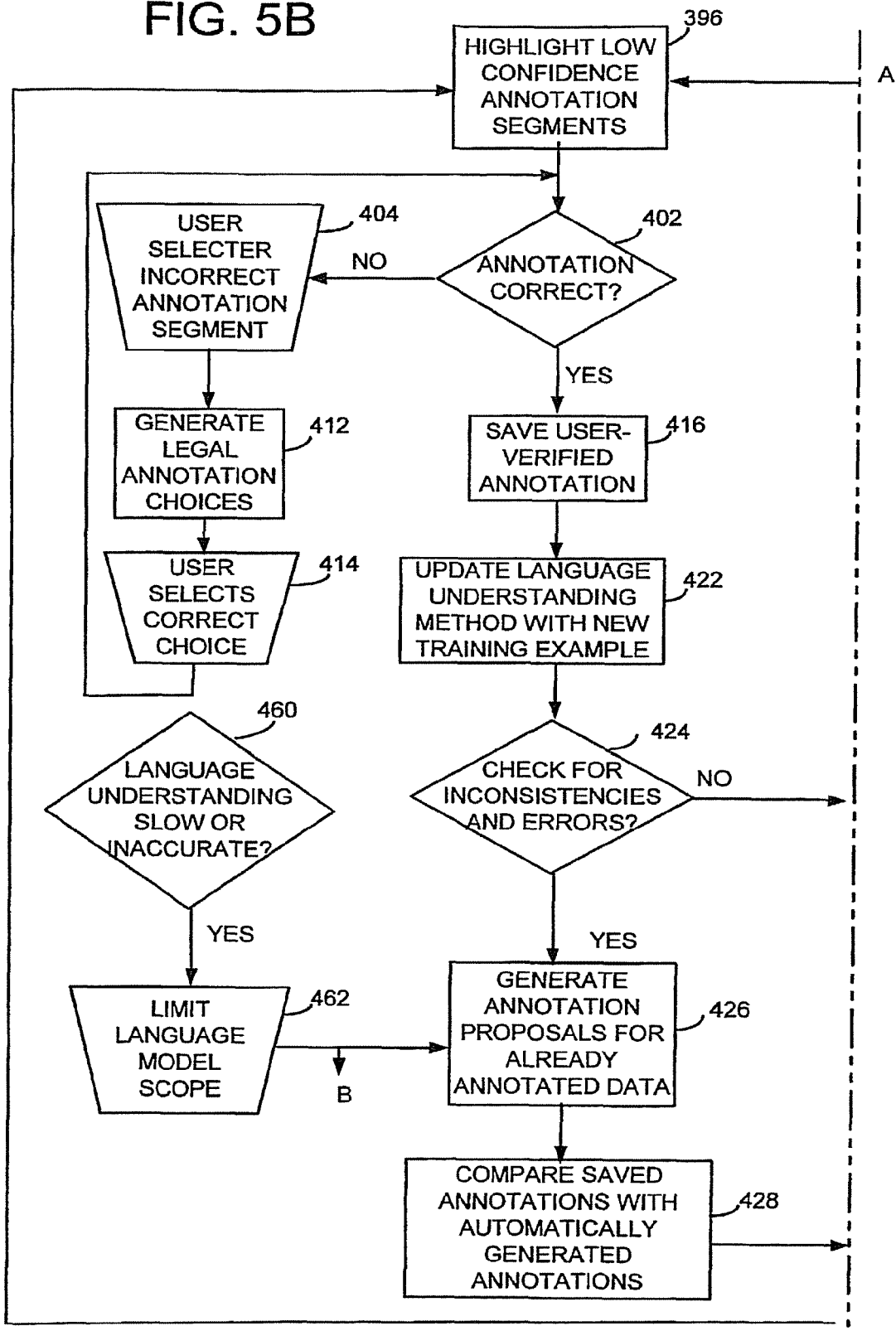

COMPUTER-AIDED NATURAL LANGUAGE ANNOTATION

The present application is based on and claims the benefit of U.S. patent application Ser. No. 10/142,623, filed May 10, 2002, the content of which is hereby incorporated by reference in its entirety.

BACKGROUND OF THE INVENTION

The present invention deals with natural language understanding. More specifically, the present invention deals with annotating training data for training a natural language understanding system.

Natural language understanding is a process by which a computer user can provide an input to a computer in a natural language (such as through a textual input or a speech input or through some other interaction with the computer). The computer processes that input and generates an understanding of the intentions that the user has expressed.

In order to train conventional natural language understanding systems, large amounts of annotated training data are required. Without adequate training data, the systems are inadequately trained and performance suffers.

However, in order to generate annotated training data, conventional systems rely on manual annotation. This suffers from a number of major drawbacks. Manual annotation can be expensive, time consuming, monotonous, and prone to error. In addition, even correcting annotations can be difficult. If the annotations are nearly correct, it is quite difficult to spot errors.

SUMMARY OF THE INVENTION

The present invention uses a natural language understanding system that is currently being trained to assist in annotating training data for training that natural language understanding system. The system is optionally initially trained using some initial annotated training data. Then, additional, unannotated training data is provided to the system and the system proposes annotations to the training data. The user is offered an opportunity to confirm or correct the proposed annotations, and the system is trained with the corrected or verified annotations.

In one embodiment, when the user interacts with the system, only legal alternatives to the proposed annotation are displayed for selection by the user.

In another embodiment, the natural language understanding system calculates a confidence metric associated with the proposed annotations. The confidence metric can be used to mark data in the proposed annotation that the system is least confident about. This draws the user's attention to the data which the system has the least confidence in.

In another embodiment, in order to increase the speed and accuracy with which the system proposes annotations, the user can limit the types of annotations proposed by the natural language understanding system to a predetermined subset of those possible. For example, the user can select linguistic categories or types of interpretations for use by the system. In so limiting the possible annotations proposed by the system, the system speed and accuracy are increased.

In another embodiment, the natural language understanding system receives a set of annotations. The system then examines the annotations to determine whether the system has already been trained inconsistently with the annotations. This can be used to detect any types of inconsistencies, even different annotation styles used by different annotators (human or machine). The system can flag this for the user in an attempt to reduce user errors or annotation inconsistencies in annotating the data.

In another embodiment, the system ranks the proposed annotations based on the confidence metric in ascending (or descending) order. This identifies for the user the training data which the system is least confident in and prioritizes that data for processing by the user.

The system can also sort the proposed annotations by any predesignated type. This allows the user to process (e.g., correct or verify) all of the proposed annotations of a given type at one time. This allows faster annotation, and encourages more consistent and more accurate annotation work.

The present system can also employ a variety of different techniques for generating proposed annotations. Such techniques can be used in parallel, and a selection algorithm can be employed to select the proposed annotation for display to the user based on the results of all of the different techniques being used. Different techniques have different strengths, and combining techniques can often produce better results than any of the individual language understanding methods.

Similarly, the present invention can display to the user the various portions of the natural language understanding models being employed which have not received adequate training data. This allows the user to identify different types of data which are still needed to adequately train the models.

DETAILED DESCRIPTION OF ILLUSTRATIVE EMBODIMENTS

The present invention deals with generating annotated training data for training a natural language understanding system. However, prior to discussing the present invention in detail, one embodiment of an environment in which the present invention may be used will be discussed.

Figure 1:
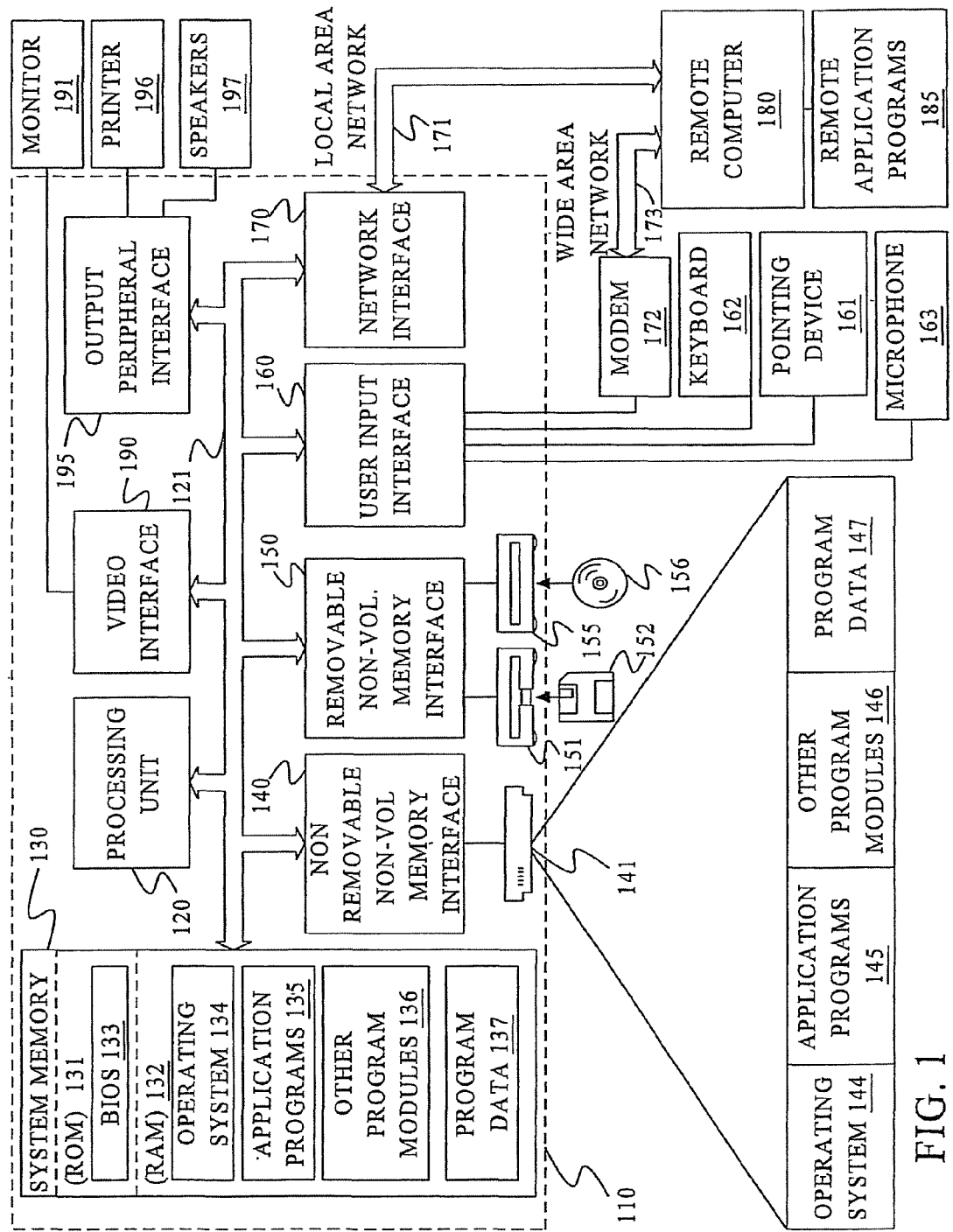
FIG. 1 is a block diagram of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non removable, volatile/nonvolatile computer storage media that can be used in the exemplary operating environment include, but are not limited to, magn tape cassettes, flash memory cards, digital versa disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
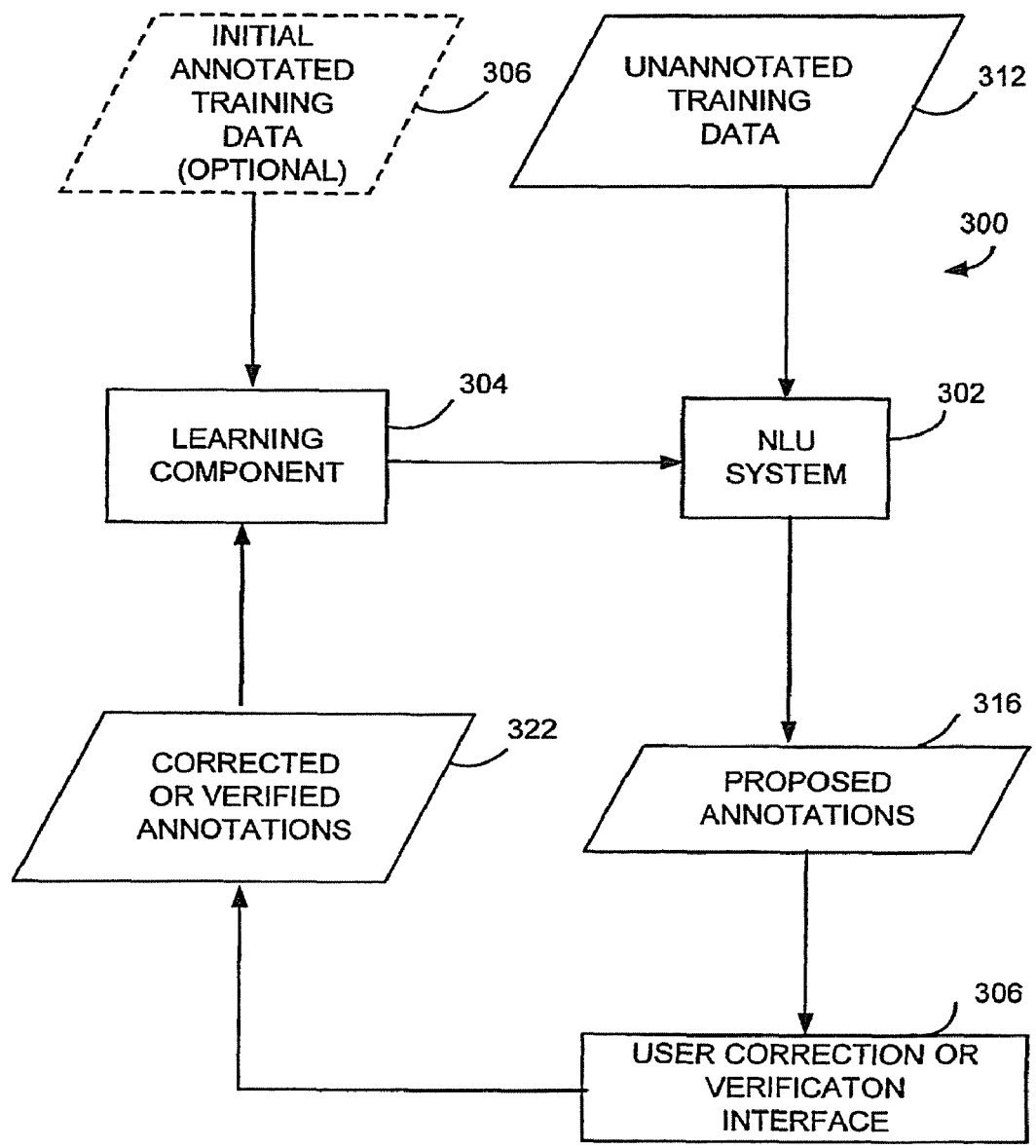
FIG. 2 is a block diagram illustrating a system for training a natural language understanding system in accordance with one embodiment of the present invention.
Figure 3:
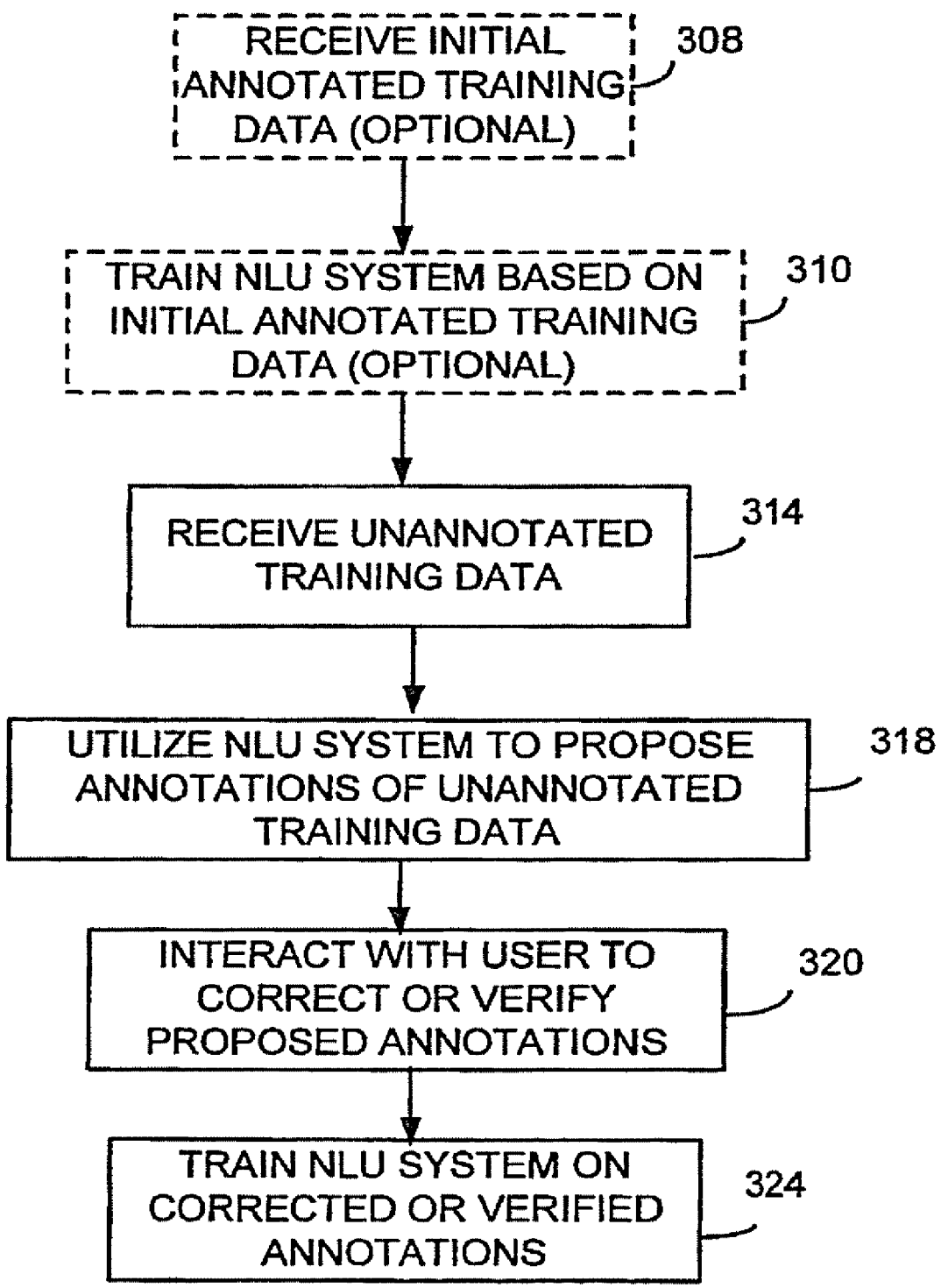
FIG. 3 is a flow diagram illustrating the overall operation of the present invention.

FIG. 2 is a block diagram illustrating a system 300 for training a natural language understanding (NLU) system in accordance with one embodiment of the present invention. System 300 includes a natural language understanding system 302 which is to be trained. System 300 also includes learning component 304 and user correction or verification interface 306. FIG. 3 is a flow diagram illustrating the overall operation of system 300 shown in FIG. 2.

NLU system 302 is illustratively a natural language understanding system that receives a natural language input and processes it according to any known natural language processing techniques to obtain and output an indication as to the meaning of the natural language input. NLU system 302 also illustratively includes models that must be trained with annotated training data.

In accordance with one embodiment of the present invention, learning component 304 is a training component that optionally receives annotated training data and trains the models used in natural language understanding (NLU) system 302. Learning component 304 can be any known learning component for modifying or training of models used in NLU system 302, and the present invention is not confined to any specific learning component 304.

In any case, learning component 304 optionally first receives initial annotated training data 306. This is indicated by block 308 in FIG. 3. Initial annotated training data 306, if it is used, includes initial data which has been annotated by the user, or another entity with knowledge of the domain and the models used in NLU system 302. Learning component 304 thus generates (or trains) the models of NLU system 302. Training the NLU system based on the initial annotated training data is optional and is illustrated by block 310 in FIG. 3.

NLU system 302 is thus initialized and can generate proposed annotations for unannotated data it receives, although the initialization step is not necessary. In any case, NLU system 302 is not well-trained yet, and many of its annotations will likely be incorrect.

NLU system 302 then receives unannotated (or partially annotated) training data 312, for which the user desires to create annotations for better training NLU system 302. It will be noted that the present invention can be used to generate annotations for partially annotated data as well, or for fully, but incorrectly annotated data. Henceforth, the term "unannotated" will be used to include all of these—data for which a further annotation is desired. Receiving unannotated training data 312 at NLU system 302 is indicated by block 314 in FIG. 3.

NLU system 302 then generates proposed annotations 316 for unannotated training data 312. This is indicated by block 318 in FIG. 3. Proposed annotations 316 are provided to user correction or verification interface 306 for presentation to the user. The user can then either confirm the proposed annotations 316 or change them. This is described in greater detail later in the application, and is indicated by block 320 in FIG. 3.

Once the user has corrected or verified proposed annotations 316 to obtain corrected or verified annotations 322, the corrected or verified annotations 322 are provided to learning component 304. Learning component 304 then trains or modifies the models used in NLU system 302 based on corrected or verified annotations 322. This is indicated by block 324 in FIG. 3.

In this way, NLU system 302 has participated in the generation of annotated training data 322 for use in training itself. While the proposed annotations 316 which are created based on unannotated training data 312 early in the training process may be incorrect, it has been found that it is much easier for the user to correct an incorrect annotation than to create an annotation for unannotated training data from scratch. Thus, the present invention increases the ease with which annotated training data can be generated.

Also, as the process continues and NLU system 302 becomes better trained, the proposed annotations 316 are correct a higher percentage of the time, or at least become more correct. Thus, the system begins to obtain great efficiencies in creating correct proposed annotations for training itself.

Figure 4:
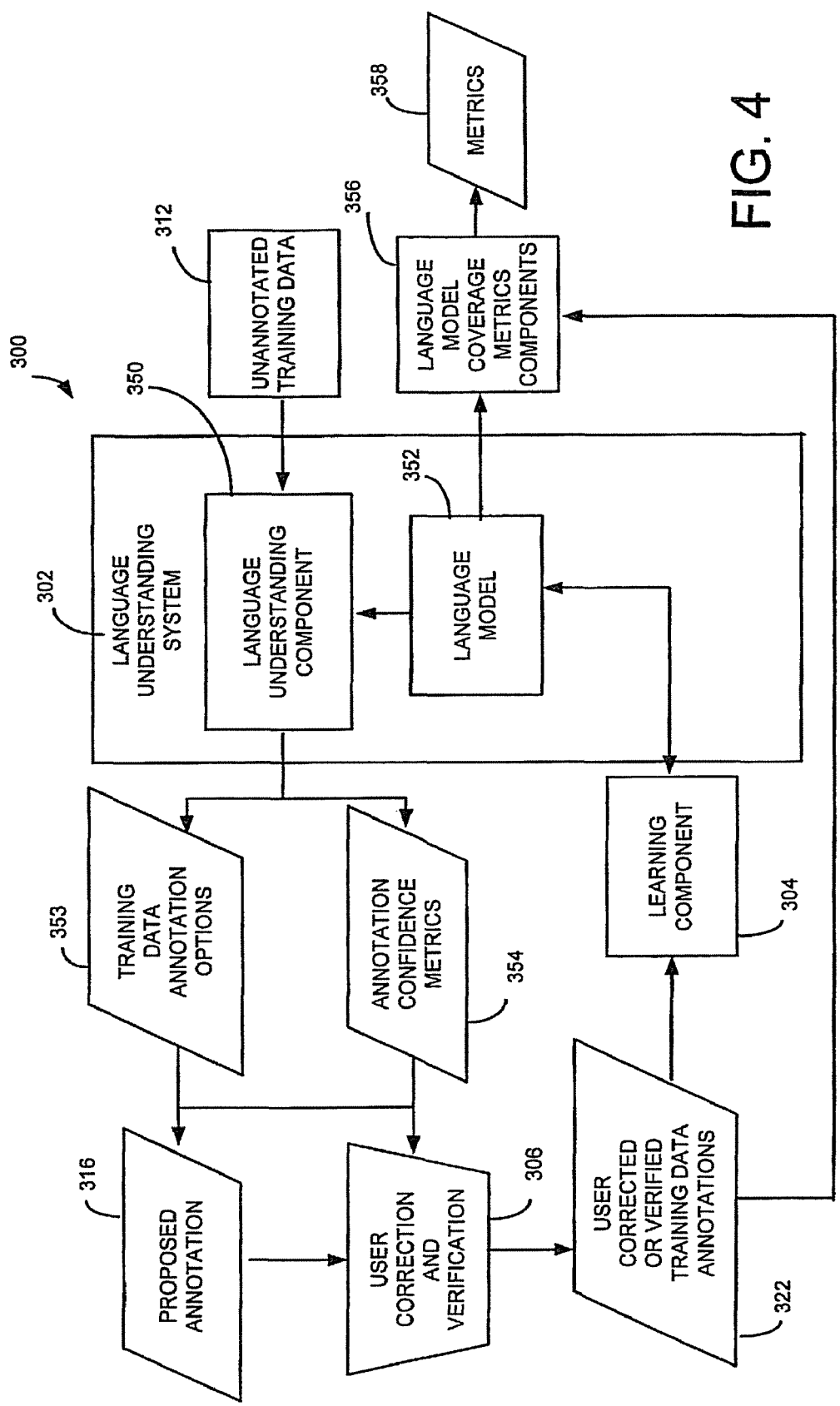
FIG. 4 is a more detailed block diagram of a system for training a natural language understanding system in accordance with one embodiment of the present invention.

FIG. 4 is a more detailed block diagram of training system 300 in accordance with one embodiment of the present invention. FIG. 4 illustrates NLU system 302 in greater detail, and also illustrates the data structures associated with system 300 in greater detail as well.

Specifically, FIG. 4 shows that NLU system 302 includes language understanding component 350 and language model 352 which could of course be any other model used by a particular natural language understanding technique. Language understanding component 350 illustratively includes one or more known language understanding algorithms used to parse input data and generate an output parse or annotation indicative of the meaning or intent of the input data. Component 350 illustratively accesses one or more models 352 in performing its processes. Language model 352 is illustrated by way of example, although other statistical or grammar-based models, or other models (such as language models or semantic models) can be used as well.

FIG. 4 further shows that the output of language understanding component 350 illustratively includes training annotation options 353 and annotation confidence metrics 354. Training annotation options 353 illustratively include a plurality of different annotation hypotheses generated by component 350 for each training sentence or training phrase (or other input unit) input to component 350. Annotation confidence metrics 354 illustratively include an indication as to the confidence that component 350 has in the associated training data annotation options 353. In one embodiment, language understanding component 350 is a known component which generates confidence metrics 354 as a matter of course. The confidence metrics 354 are associated with each portion of the training annotation options 353.

FIG. 4 also shows a language model coverage metrics generation component 356. Component 356 is illustratively programmed to determine whether the parts of model 352 have been adequately trained. In doing so, component 356 may illustratively identify the volume of training data which has been associated with each of the various portions of model 352 to determine whether any parts of model 352 have not been adequately covered by the training data. Component 356 outputs the model coverage metrics 358 for access by a user. Thus, if portions of model 352 have not been trained with adequate amounts of training data, the user can gather additional training data of a given type in order to better train those portions of model 352.

Figure 5A:
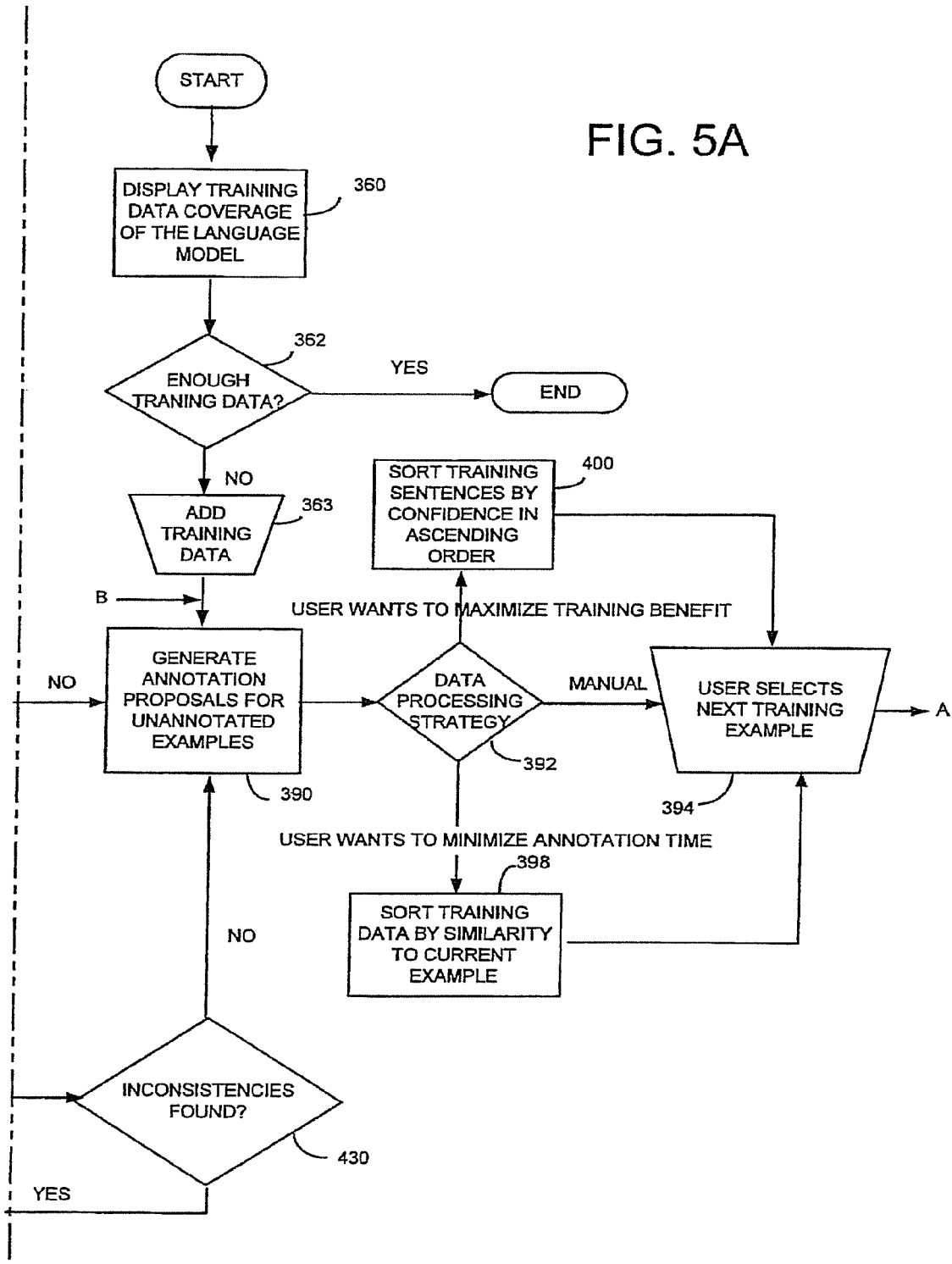
FIG. 5 is a more detailed flow diagram illustrating operation of the present invention.
Figure 6:
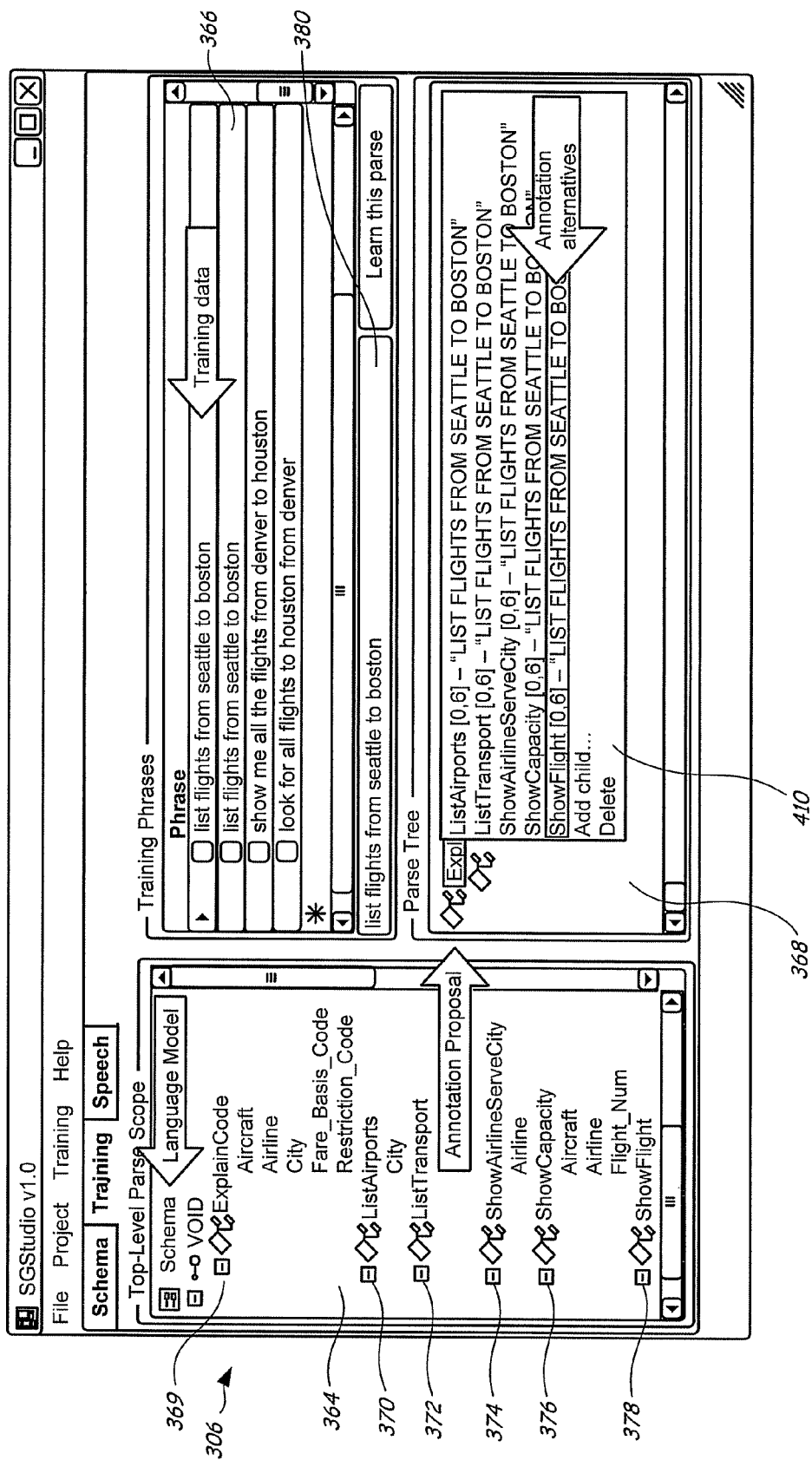
FIGS. 6 and 7 are screen shots which illustrate embodiments of a user interface employed by the present invention.

FIG. 5 is a flow diagram illustrating operation of the system in greater detail. FIG. 6 illustrates one embodiment of a user interface 306 employed by the present invention and will be discussed in conjunction with FIG. 5. User interface 306 has a first pane 364, a second pane 366 and a third pane 368. Pane 364 is a parse tree which is representative of language model 352 (which as mentioned above could be any other type of model). The parse tree has a plurality of nodes 368, 370, 372, 374, 376 and 378. In the exemplary embodiment illustrated in FIG. 6, each of these nodes corresponds to a command to be recognized by language model 352.

In the example illustrated in FIG. 6, the natural language understanding system being employed is one which facilitates checking and making of airline reservations. Therefore, the nodes 368-378 are all representative of commands to be recognized by NLU 302 (and thus specifically modeled by language model 352). Thus, the commands shown are those such as "Explain Code", "List Airports", "Show Capacity", etc. Each of the nodes has one or more child nodes depending therefrom which contain attributes that further define the command nodes. The attributes are illustratively slots which are filled-in in order to completely identify the command node which has been recognized or understood by NLU system 302. The slots may also, in turn, have their own slots to be filled.

Pane 366 displays a plurality of different training phrases (in training data 312) which are used to train the model represented by the parse tree in pane 364. The user can simply select one of these phrases (such as by clicking on it with a mouse cursor) and system 350 applies the training phrase against language understanding component 350 and language model 352 illustrated in pane 364. The proposed parse (or annotation) 316 which the system generates is displayed in pane 368. Field 380 displays the training phrase selected by the user but also allows the user to type in a training phrase not found in the list in pane 366.

In operation (as illustrated in FIG. 5) system 300 first displays training data coverage of the language model (e.g., the model coverage metrics 358) to the user. This is indicated by block 360 in FIG. 5. In generating the model coverage metrics, a group of rules in the language model illustrated in pane 364, for example, may have a number of sections or grammar rules for which very little training data has been processed. In that case, if the amount of training data has not reached a preselected or dynamically selected threshold, the system will illustratively highlight or color code (or otherwise visually contrast) portions of the language model representation in pane 364 to indicate the amount of training data which has been collected and processed for each section of the model. Of course, the visual contrasting may indicate simply that the amount of data has been sufficient or insufficient, or it can be broken into additional levels to provide a more fined grained indication as to the specific amount of training data used to train each portion of the model. This visual contrasting can also be based on model performance.

If enough training data has been processed, and all portions of the model 352 are adequately trained, the training process is complete. This is indicated by block 362. However, if, at block 362, it is determined that additional training data is needed, then additional unannotated training data 312 is input to NLU system 302. This is indicated by block 363 in FIG. 5. The additional training data 312 will illustratively include a plurality of training sentences or phrases or other linguistic units.

When the user adds training data 312 as illustrated in block 363, multiple training phrases or training sentences or other units can be applied to NLU system 302. NLU system 302 then generates annotation proposals for all of the unannotated examples fed to it as training data 312. This is indicated by block 390. Of course, for each unannotated training example, NLU system 302 can generate a plurality of training annotation options 353 (shown in FIG. 4) along with associated annotation confidence metrics 354. If that is the case, NLU system 302 chooses one of the training options 353 as the proposed annotation 316 to be displayed to the user. This is illustratively done using the confidence metrics 354.

In any case, once the annotation proposals for each of the unannotated training examples have been generated at block 390, the system is ready for user interaction to either verify or correct the proposed annotations 316. The particular manner in which the proposed annotations 316 are displayed to the user depends on the processing strategy that can be selected by the user as indicated by block 392. If the user selects the manual mode, processing simply shifts to block 394. In that case, again referring to FIG. 6, the user simply selects one of the training examples from pane 366 and the system displays the proposed annotation 316 for that training example in pane 368.

The system can also, in one embodiment, highlight the portion of the annotation displayed in pane 368 which has the lowest confidence metric 354. This is indicated by block 396 in FIG. 5. It can be difficult to spot the difference between an annotation which is slightly incorrect, and one which is 100% correct. Highlighting low confidence sections of the proposed annotation draws the user's attention to the portions which the NLU system 302 is least confident in, thus increasing the likelihood that the user will spot incorrect annotations.

If, at block 392, the user wishes to minimize annotation time and improve annotation consistency, the user selects this through an appropriate input to NLU 302, and NLU system 302 outputs the training data examples in pane 366 grouped by similarity to the example which is currently selected. This is indicated by block 398. In other words, it is believed to be easier for a user to correct or verify proposed annotations and make more consistent annotation choices if the user is correcting proposed annotations of the same type all at the same time. Thus, in the example illustrated in FIG. 6, if the training data includes 600 training examples for training the model on the "Show Flight" command (represented by node 378) the user may wish to process (either correct or verify) each of these examples one after the other rather than processing some "Show Flight" examples interspersed with other training examples. In that case, system 302 groups the "Show Flight" training sentences together and displays them together in pane 366. Of course, there are a variety of different techniques that can be employed to group similar training data, such as grouping similar annotations, and grouping annotations with similar words, to name a few. Therefore, as the user clicks from one example to the next, the user is processing similar training data. Once the training sentences have been grouped and displayed in this manner, processing proceeds with respect to block 394 in which the user selects one of the training examples and the parse, or annotation, for that example is shown in pane 368.

If, at block 392, the user wishes to maximize the training benefit per example corrected or verified by the user, the user selects this option through an appropriate input to NLU system 302. In that case, NLU system 302 presents the training sentences and proposed annotations 316 sorted based on the annotation confidence metrics 354 in ascending order. This provides the example sentences which the system is least confident in at the top of the list. Thus, as the user selects and verifies or corrects each of these examples, the system is learning more than it would were it processing an example which it had a high degree of confidence in. Of course, the proposed annotations and training sentences can be ranked in any other order as well, such as by descending value of the confidence metrics. Presenting the training examples ranked by the confidence metrics is indicated by block 400 in FIG. 5.

Regardless of which of the three processing strategies the user selects, the user is eventually presented with a display that shows the information set out in FIG. 6, or similar information. Thus, the user must select one of the training examples from pane 366 and the parse tree (or annotation) for that example is illustratively presented in block 368, with its lowest confidence portions illustratively highlighted or somehow indicated to the user, based on the annotation confidence metrics 354. This is indicated by block 396 in FIG. 5.

The user then determines whether the annotation is correct as indicated by block 402. If not, the user selects the incorrect annotation segment in the parse or annotation displayed in pane 368 by simply clicking on that segment, or highlighting it with the cursor. Selecting the incorrect annotation segment is indicated by block 404 in FIG. 5.

In the example shown in FIG. 6, it can be seen that the user has highlighted the top node in the proposed annotation (the "Explain Code" node). Once that segment has been selected, or highlighted, system 302 displays, such as in a drop down box 410, all of the legal annotation choices (from training data annotation options 353) available for the highlighted segment of the annotation. These annotation options 353 can be displayed in drop down box 410 in order of confidence based upon the annotation confidence metrics 354, or in any other desired order as well. This is indicated by block 412 in FIG. 5.

By "legal annotations choices" is meant those choices which do not violate the constraints of the model or models 352 being used by system 302. For example, for processing an English language input, the model or models 352 may well have constraints which indicate that every sentence must have a verb, or that every prepositional phrase must start with a preposition. Such constraints may be semantic as well. For example, the constraints may allow a city in the "List Airport" command but not in "Show Capacity" command. Any other of a wide variety of constraints may be used as well. When the user has selected a portion of the annotation in pane 368 which is incorrect, system 302 does not generate all possible parses or annotations for that segment of the training data. Instead, system 302 only generates and displays those portions or annotations, for that segment of the training data, which will result in a legal parse of the overall training sentence. If a particular annotation could not result in a legal overall parse (one which does not violate the constraints of the models being used) then system 302 does not display that possible parse or annotation as an option for the user in drop down box 410.

Once the alternatives are shown in drop down box 410, the user selects the correct one by simply highlighting it and clicking on it. This is indicated by block 414 in FIG. 5. Processing then reverts to block 402 where it is determined that the annotation is now correct.

The corrected or verified annotation 322 is then saved and presented to learning component 304. This is indicated by block 416 in FIG. 5. Learning component 304 is illustratively a known learning algorithm which modifies the model based upon a newly entered piece of training data (such as corrected or verified annotations 322). The updated language model parameters are illustrated by block 420 in FIG. 4, and the process of generating those parameters is indicated by block 422 in FIG. 5.

System 302 can also check for inconsistencies among previously annotated training data. For example, as NLU system 302 learns, it may learn that previously or currently annotated training data was incorrectly annotated. Basically, this checks whether the system correctly predicts the annotations the user chose for past training examples. Prediction errors can suggest training set inconsistency.

Determining whether to check for these inconsistencies is selectable by the user and is indicated by block 424. If learning component 304 is to check for inconsistencies, system 302 is controlled to again output proposed annotations for the training data which has already been annotated by the user. Learning component 304 compares the saved annotation data (the annotation which was verified or corrected by the user and saved) with the automatically generated annotations. Learning component 304 then looks for inconsistencies in the two annotations as indicated by block 430. If there are no inconsistencies, then this means that the annotations corrected or verified by the user are not deemed erroneous by the system and processing simply reverts to block 390 where annotation proposals are generated for the next unannotated example selected by the user.

However, if, at block 430, inconsistencies are found, this means that system 302 has already been trained on a sufficient volume of training data that would yield an annotation inconsistent with that previously verified or corrected by the user that the system has a fairly high degree of confidence that the user input was incorrect. Thus, processing again reverts to block 396 where the user's corrected or verified annotation is again displayed to the user in pane 368, again with the low confidence portions highlighted to direct the user's attention to the portion of the annotation which system 302 has deemed likely erroneous. This gives the user another opportunity to check the annotation to ensure it is correct as illustrated by block 402.

When annotations have been finally verified or corrected, the user can simply click the "Learn This Parse" button (or another similar actuator) on UI 306 and the language model is updated by learning component 304.

It should also be noted that another feature is contemplated by the present invention. Even if only legal annotations are generated and displayed to the user during correction, this can take a fairly large amount of time. Thus, the present invention provides a mechanism by which the user can limit the natural language analysis of the input example to specific subsets of the possible analyses. Such limits can, for example, be limiting the analysis to a single linguistic category or to a certain portion of the model. In the example illustrated in FIG. 6, if the user is processing the "Show Capacity" commands, for instance, the user can simply highlight that portion of the model prior to selecting a next training sentence. This is indicated by blocks 460 and 462 in FIG. 5. Thus, in the steps where NLU system 302 is generating proposed annotations, it will limit its analysis and proposals to only those annotations which fall under the selected node in the model. In other words, NLU system 302 will only attempt to map the input training sentence to the nodes under the highlighted command node. This can significantly reduce the amount of processing time and improve accuracy in generating proposed annotations.

Figure 7:
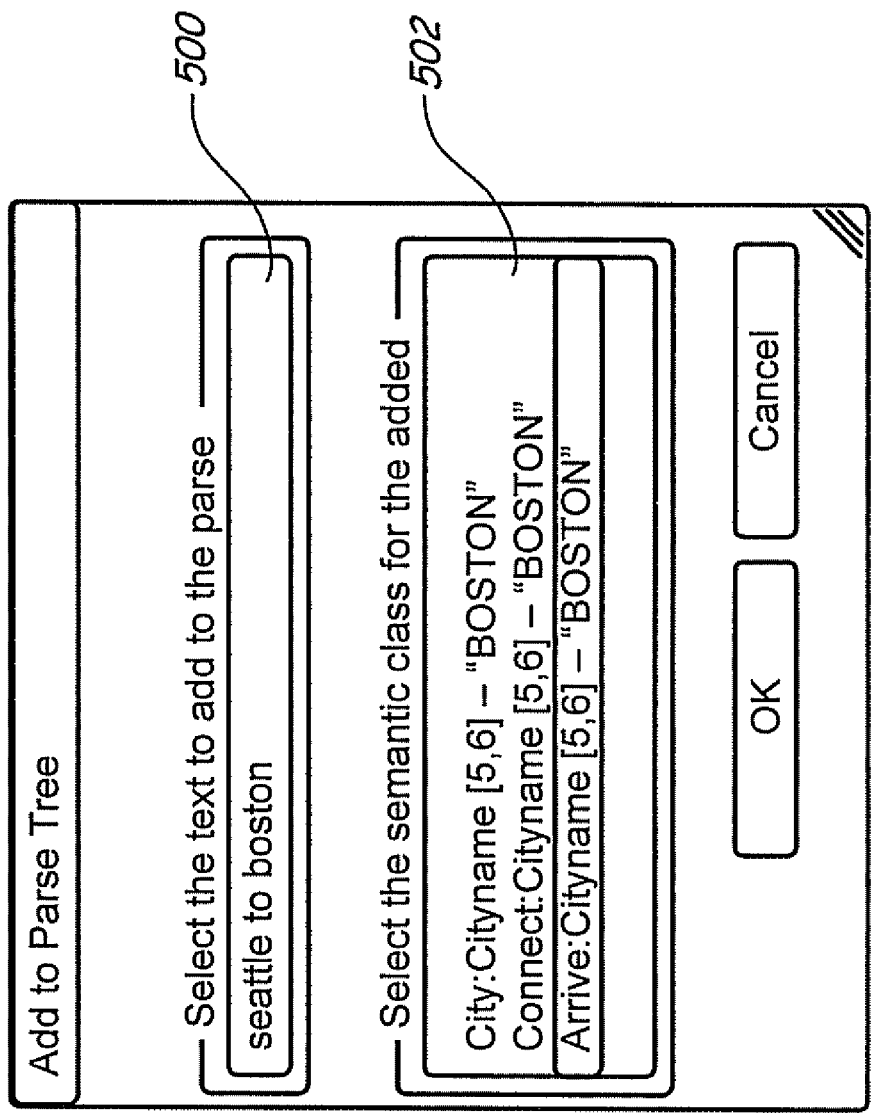
Figure 8:
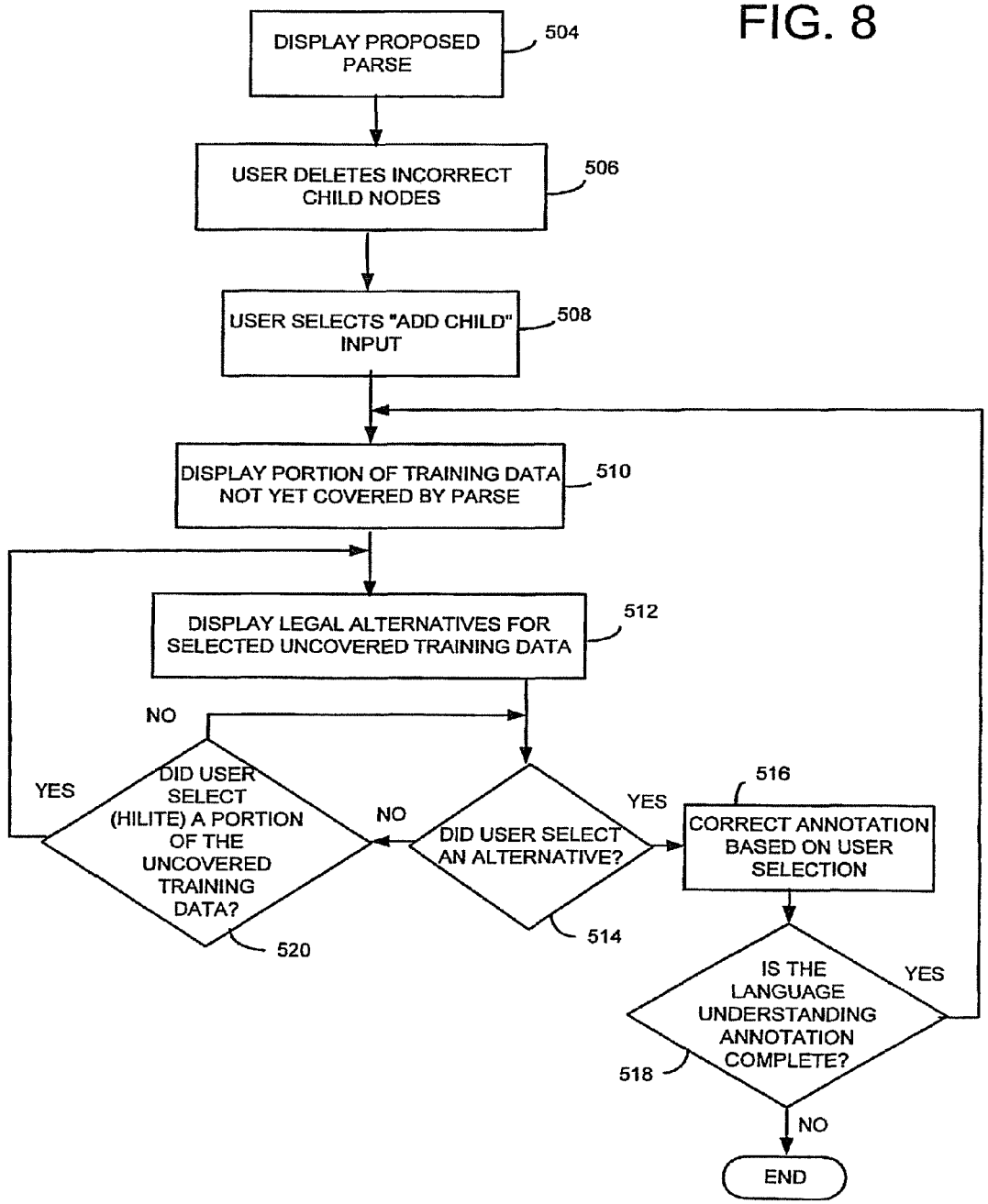
FIG. 8 is a flow diagram illustrating operation of the present system in adding or deleting nodes in proposed annotations in accordance with one embodiment of the present invention.

FIGS. 7 and 8 illustrate yet another feature in accordance with one embodiment of the present invention. As discussed above with respect to FIG. 6, once the user selects a training sentence in pane 366, that training sentence or phrase is applied against the language model (or other model) in NLU system 302 (or it has already been applied) and system 302 generates a proposed annotation which is displayed in pane 368. If that proposed annotation is incorrect, the user can highlight the incorrect segment of the annotation and the system will display all legal alternatives. However, it may happen that a portion of the annotation proposal displayed in pane 368 may be incorrect not just because a node is mislabeled, but instead because a node is missing and must be added, or because too many nodes are present and one must be deleted or two must be combined.

If a node must be deleted, the user simply highlights it and then selects delete from drop down box 410. However, if additional changes to the node structure must be made, the user can select the "add child" option in drop down box 410. In that case, the user is presented with a display similar to that shown in FIG. 7.

FIG. 7 has a first field 500 and a second field 502. The first field 500 displays a portion of the training sentence or training phrase, and highlights the portion of the training phrase which is no longer covered by the annotation proposal presented in pane 368, but which should be. It will be appreciated that complete annotations need not cover every single word in a training sentence. For example, the word "Please" preceding a command may not be annotated. The present feature of the invention simply applies to portions not covered by the annotation, but which may be necessary for a complete annotation.

In the example shown in FIG. 7, the portion of the training sentence which is displayed is "Seattle to Boston". FIG. 7 further illustrates that the term "Seattle" is covered by the annotation currently displayed in pane 368 because "Seattle" appears in gray lettering. The terms "to Boston" appear in bold lettering indicating that they are still not covered by the parse (or annotation) currently displayed in pane 368.

Box 502 illustrates all of the legal annotation options available for the terms "to Boston". The user can simply select one of those by highlighting it and actuating the "ok" button. However, the user can also highlight either or both words ("to Boston") in box 500, and system 302 generates all possible legal annotation options for the highlighted words, and displays those options in box 502. Thus if the user selects "to", box 502 will list all possible legal annotations for "to". If the user selects "Boston", box 502 lists all legal annotations for "Boston". If the user selects "to Boston", box 502 lists all legal annotations for "to Boston". In this way, the user can break the portion of the training sentence displayed in box 500 (which is not currently covered by the proposed annotation) into any desired number of nodes by simply highlighting any number of portions of the training sentence, and selecting the proper one of the legal annotation options displayed in box 502.

Specifically, as shown in FIG. 8, assume that system 300 has displayed a proposed parse or annotation in pane 368 for a selected training sentence. This is indicated by block 504. Assume then that the user has deleted an incorrect child node as indicated by block 506. The user then selects the "Add Child" option in the drop down box 410 as indicated by block 508. This generates a display similar to that shown in FIG. 7 in which the system displays the portion of the training data not yet covered by the parse (since some of the proposed annotation or parse has been deleted by the user). This is indicated by block 510.

The system then displays legal alternatives for a selected portion of the uncovered training data as indicated by block 512. If the user selects one of the alternatives, then the annotation displayed in pane 368 is corrected based on the user's selection. This is indicated by blocks 514 and 516, and it is determined whether the current annotation is complete. If not, processing reverts to block 510. If so, however, processing is completed with respect to this training sentence. This is indicated by block 518.

If, at block 514, the user did not select one of the alternatives from field 502, then it is determined whether the user has selected (or highlighted) a portion of the uncovered training data from field 500. If not, the system simply waits for the user to either select a part of the uncovered data displayed in field 500 or to select a correct parse from field 502. This is indicated by block 520. However, if the user has highlighted a portion of the uncovered training data in field 500, then processing returns to block 512 and the system displays the legal alternatives for the selected uncovered training data so that the user can select the proper annotation.

Figure 9:
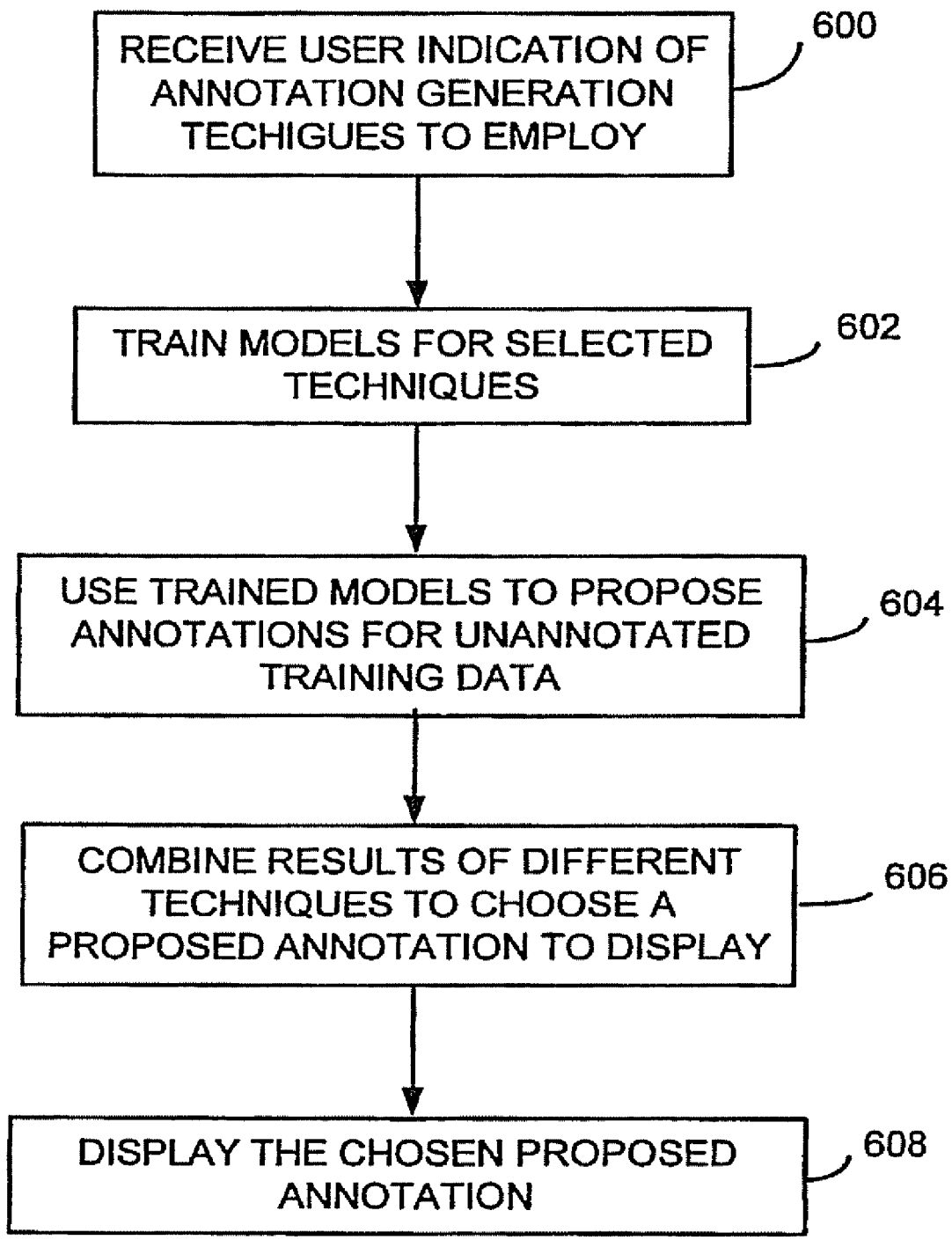
FIG. 9 is a flow diagram illustrating the use of a variety of natural language understanding techniques in proposing annotated data in accordance with one embodiment of the present invention.

In accordance with yet another embodiment of the present invention, a variety of different techniques for generating annotations for sentences (or any other natural language unit such as a word, group of words, phrase(s) or sentence or group of sentences) are known. For example, both statistical and grammar-based classification systems are known for generating annotations from natural language inputs. In accordance with one embodiment of the present invention, a plurality of different techniques are used to generate annotations for the same training sentences (or other natural language units). System 302 thus includes, in language understanding component 350, a variety of different algorithms for generating proposed annotations. Of course, system 302 also illustratively includes the corresponding models associated with those different algorithms. FIG. 9 is a flow diagram illustrating how these techniques and different algorithms and models can be used in accordance with one embodiment of the present invention.

The user first indicates to system 302 (through a user interface actuator or other input technique) which of the annotation generation techniques the user wishes to employ (all, some, or just one). This is indicated by block 600. The techniques can be chosen by testing the performance of each against human-annotated sentences, or any other way of determining which are most effective. System 300 then trains the models associated with each of those techniques on the initial annotated training data used to initialize the system. This is indicated by block 602. The trained models are then used to propose annotations for the unannotated training data in a similar fashion as that described above, the difference being that annotations are generated using a plurality of different techniques, at the same time. This is indicated block 604.

The results of the different techniques are then combined to choose a proposed annotation to display to the user. This is indicated by block 606. A wide variety of combination algorithms can be used to pick the appropriate annotation. For example, a voting algorithm can be employed to choose the proposed annotation which a majority of the annotation generation techniques agree on. Of course, other similar or even smarter combinations algorithms can be used to pick a proposed annotation from those generated by the annotation generation techniques.

Once the particular annotation has been chosen, as the proposed annotation, it is displayed through the user interface. This is indicated by block 608.

It can thus be seen that many different embodiments of the present invention can be used in order to facilitate the timely, efficient, and inexpensive annotation of training data in order to train a natural language understanding system. Simply using the NLU system itself to generate annotation proposals drastically reduces the amount of time and manual work required to annotate the training data. Even though the system will often make errors initially, it is less difficult to correct a proposed annotation then it is to create an annotation from scratch.

By presenting only legal alternatives during correction, the system promotes more efficient annotation editing. Similarly, using confidence metrics to focus the attention of the user on portions of the proposed annotations for which the system has lower confidence reduces annotation errors and reduces the amount of time required to verify a correct annotation proposal.

Further, by providing a user interface that allows a user to limit the natural language understanding methods to subsets of the model also improves performance. If the user is annotating a cluster of data belonging to a single linguistic category, the user can limit natural language analysis to that category and speed up processing, and improve accuracy of annotation proposals.

The present invention can also assist in spotting user annotation errors by applying the language understanding algorithm to the annotated training data (confirmed or corrected by the user) and highlighting cases where the system disagrees with the annotation, or simply displaying the annotation with low confidence metrics highlighted. This system can also be configured to prioritize training on low confidence data. In one embodiment, that training data is presented to the user for processing first.

In another embodiment, similar training data is grouped together using automatically generated annotation proposals or any other technique for characterizing linguistic similarity. This makes it easier for the user to annotate the training data, because the user is annotating similar training examples at the same time. This also allows the user to annotate more consistently with fewer errors. Also, patterns in the training data can be easier to identify when like training examples are clustered.

The present invention also provides for combining multiple natural language understanding algorithms (or annotation proposal generation techniques) for more accurate results. These techniques can be used in parallel to improve the quality of annotation support provided to the user.

In addition, since it is generally important to obtain training data that covers all portions of the language model (or other model being used), one embodiment of the present invention displays a representation of the language model, and highlights or visually contrasts portions of the model based on the amount of training data which has been used in training those portions. This can guide the user in training data collection efforts by indicating which portions of the model need training data the most.

Although the present invention has been described with reference to particular embodiments, workers skilled in the art will recognize that changes may be made in form and detail without departing from the spirit and scope of the invention.

What is claimed is:

1. A method, performed using one or more processors, of generating annotated training data for training a natural language understanding system, comprising:

generating, with the natural language understanding system running on one or more of the processors, a proposed annotation for each of a plurality of units of unannotated training data received via one or more input components;

calculating, with one or more of the processors, a confidence measure for each of a plurality of different portions of the proposed annotations for a given unit of the training data;

displaying on an output component a proposed annotation for a given unit of the training data, with portions of the proposed annotation for which the confidence measure is below a threshold being displayed in a visually contrasting way to other portions of the proposed annotation;

receiving user selection of a selected portion of the proposed annotation displayed;

displaying on the output component at least some proposed alternative annotations, for the selected portion of the proposed annotation, in an order based on the confidence measures of the proposed alternative annotations, with one or more input components providing one or more user-actuable inputs configured for verification of the proposed alternative annotations and one or more user-actuable inputs configured for deletion of the proposed alternative annotations;

when an input for verification is received, responding, with one or more of the processors, to the input for verification of one of the proposed alternative annotations by storing the verified annotation for the portion of the given unit of the training data; and when an input for deletion is received, responding, with one or more of the processors, to the input for deletion of one of the proposed alternative annotations by presenting on an output component at least some of the remaining proposed alternative annotations in an order based on the confidence measures of the remaining proposed alternative annotations.

2. The method of claim 1 in which displaying proposed alternative annotations comprises:

displaying the proposed alternative annotations in order based on ascending value of the corresponding confidence measures.

3. The method of claim 1 in which displaying proposed alternative annotations comprises:

displaying the proposed alternative annotations in order based on descending value of the corresponding confidence measures.

4. The method of claim 1 and further comprising:

training the NLU system with the verified annotation.

5. A method, performed using one or more processors, of generating annotated training data for training a natural language understanding (NLU) system, comprising:

generating, with the NLU system running on one or more of the processors, a proposed annotation for each of a plurality of units of unannotated training data, each proposed annotation having a semantic type;

displaying on an output component at least some of the proposed annotations in an order based on the semantic type of each of the proposed annotations, with one or more input components providing one or more user-actuable inputs configured for verification of the proposed annotations and one or more user-actuable inputs configured for deletion of the proposed annotations;

when an input for verification is received, responding, with one or more of the processors, to the input for verification of one of the proposed annotations by storing the verified annotation for the given unit of the training data; and when an input for deletion is received, responding, with one or more of the processors, to the input for deletion of one of the proposed annotations by presenting at least some of the remaining proposed annotations in an order based on the semantic type of each of the remaining proposed annotations.

6. The method of claim 5 in which displaying comprises:

sorting the proposed annotations based on semantic type; and displaying the proposed annotations with those of a similar semantic type grouped together.

7. The method of claim 5 in which re-displaying comprises:

displaying the user-confirmed annotations by visually contrasting portions in which the NLU system has a calculated confidence measure below a threshold.

8. The method of claim 5 and further comprising:

training the NLU system with the verified annotations.

9. A method, performed using one or more processors, of generating annotated training data for training a natural language understanding (NLU) system employing a plurality of different natural language training techniques, comprising:

generating, with the natural language understanding system running on one or more of the one or more processors, a plurality of proposed annotations by using each of the plurality of natural language training techniques to generate a different proposed annotation specific to the natural language training technique that generated it, for a unit of unannotated training data, to obtain the plurality of proposed annotations, each generated by one of the plurality of natural language training techniques used for that unit of unannotated training data;

displaying, simultaneously, on an output component, at least two of the proposed annotations, the at least two proposed annotations being generated by two different natural language training techniques, and further displaying the proposed annotations with user actuable inputs for user rejection or user selection of each of the displayed proposed annotations;

when an input for user rejection is received, responding, with one or more of the one or more processors, to the input for user rejection of one of the proposed annotations by displaying on an output component one or more of any remaining proposed annotations; and when an input for user selection is received, responding, with one or more of the processors, to the input for user selection of one of the proposed annotations by storing the selected annotation for the given unit of the training data.

10. The method of claim 9 in which displaying comprises:

displaying the proposed annotations with corresponding indications of the natural language training technique with which one or more of the proposed annotations were generated.

11. The method of claim 9 in which displaying the proposed annotations comprises:

sorting the proposed annotations based on the natural language training techniques with which the proposed annotations were generated; and displaying the proposed annotations with those generated with the same natural language training techniques grouped together.

12. The method of claim 9 in which displaying comprises:

displaying the proposed annotations in order based on ascending value of corresponding confidence measures.

13. The method of claim 9 and further comprising:

training the NLU system with the proposed annotations.

* * * * *